US010291557B2

(12) United States Patent
Norhammar et al.

(10) Patent No.: US 10,291,557 B2
(45) Date of Patent: May 14, 2019

(54) STREAMING MEDIA CONTENT TO A USER EQUIPMENT IN AN INTERNET PROTOCOL MULTIMEDIA SUBSYSTEM (71) Applicant: Telefonaktiebolaget LM Ericsson (publ), Stockholm (SE)

(72) Inventors: Björn Norhammar, Stocksund (SE); Jan Lidin, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 15/122,668

(22) PCT Filed: Mar. 3, 2014

(86) PCT No.: PCT/EP2014/054074
§ 371 (c)(1),
(2) Date: Aug. 31, 2016

(87) PCT Pub. No.: WO2015/131922
PCT Pub. Date: Sep. 11, 2015

(65) Prior Publication Data
US 2017/0070456 A1    Mar. 9, 2017

(51) Int. Cl.
*H04L 12/58*  (2006.01)
*H04L 29/06*  (2006.01)
(Continued)

(52) U.S. Cl.
CPC .......... *H04L 51/04* (2013.01); *H04L 65/1006* (2013.01); *H04L 65/1016* (2013.01);
(Continued)

(58) Field of Classification Search
CPC ..... H04L 51/043; H04L 51/046; H04L 51/02; H04L 51/04; H04L 51/10; H04L 65/1016;
(Continued)

(56) References Cited

U.S. PATENT DOCUMENTS

2004/0148400 A1    7/2004    Mostafa et al.
2008/0249946 A1*   10/2008   Candelore ............... G06F 21/10
                                                              705/59
(Continued)

FOREIGN PATENT DOCUMENTS

EP    1883189 A2     1/2008
EP    2496044 A1 *   9/2012    ......... H04N 7/17318
EP    2496044 A1     9/2012

OTHER PUBLICATIONS

GSMA, "Rich Communication Suite 5.1 Advanced Communications Services and Client Specification", Official Document RCC. 07, Version 2.0, May 3, 2013, 1-482.

*Primary Examiner* — Ruolei Zong
(74) *Attorney, Agent, or Firm* — Murphy, Bilak & Homiller, PLLC (57) ABSTRACT An application server (204, 300), a first user equipment, UE, (200, 400), a second UE (206, 500) and corresponding methods for use in an Internet protocol multimedia subsystem, IMS, and for streaming media content between the first UE and the second UE using the Rich Communications Services, RCS, standard. The first UE transmits media content to an application server (204, 300) as an RCS file transfer. The application server receives the media content from the first UE as an RCS file transfer and stores the media content in a memory (306). The first UE compiles a message comprising a media content identifier and transmits the compiled message to the second UE using an RCS text based communication. The second UE receives the RCS text based communication from the first UE and transmits a request for the media content to the application server. The application server receives the request, converts the stored media content into streaming data suitable for streaming to the second UE and streams the streaming data to the second UE as an (Continued)

RCS video share, such that the media content can be viewed at the second UE only while it is being streamed.

41 Claims, 7 Drawing Sheets

(51) Int. Cl.
*H04N 21/643* (2011.01)
*H04N 21/2343* (2011.01)
*H04N 21/2743* (2011.01)
*H04N 21/4788* (2011.01)

(52) U.S. Cl.
CPC ........ *H04L 65/4084* (2013.01); *H04L 65/601* (2013.01); *H04L 65/605* (2013.01); *H04L 65/608* (2013.01); *H04N 21/234336* (2013.01); *H04N 21/2743* (2013.01); *H04N 21/4788* (2013.01); *H04N 21/643* (2013.01)

(58) Field of Classification Search
CPC ............. H04L 65/1006; H04L 65/1069; H04L 65/1073; H04L 65/605; H04L 65/4084; H04L 65/60; H04L 65/601; H04L 67/02; H04N 21/00; H04N 21/6437; H04N 21/234336; H04N 21/2743; H04N 21/4788; H04N 21/643
USPC ........................................................ 709/206
See application file for complete search history.

(56) References Cited

U.S. PATENT DOCUMENTS

| | | | |
|---|---|---|---|
| 2012/0225652 A1* | 9/2012 | Martinez | H04M 3/42374 455/435.1 |
| 2013/0301529 A1* | 11/2013 | Lindsay | H04W 4/12 370/328 |
| 2014/0059118 A1* | 2/2014 | Pidady | H04L 67/06 709/203 |
| 2015/0058398 A1* | 2/2015 | Moncomble | H04L 67/14 709/202 |
| 2015/0117444 A1* | 4/2015 | Sandblad | H04L 65/1059 370/352 |
| 2015/0163838 A1* | 6/2015 | Bouvet | H04L 65/1006 370/329 |

* cited by examiner

STREAMING MEDIA CONTENT TO A USER EQUIPMENT IN AN INTERNET PROTOCOL MULTIMEDIA SUBSYSTEM

TECHNICAL FIELD

The invention relates to methods and apparatus configured for streaming media content from an a first user equipment (UE) to a second user equipment in an Internet protocol multimedia subsystem (IMS). More specifically, the invention relates to methods and apparatus configured for streaming media content from a first UE to a second UE such that the media content may be viewed at the second UE only while it is being streamed.

BACKGROUND

As used herein, the term "media content" encompasses audio and/or visual data such as images, videos and or audio files. For the purposes of this document, media content encompasses separate files of data that are to be transferred between UEs outside of a voice call or video call scenario. Media content may be considered to be distinct from audio and visual data transferred between UEs, for example, as part of a voice call or a video call. In particular, media content, as referred to herein, encompasses image, video and/or audio data files transferred between UEs during a chat session.

As used herein, the term "text based Rich Communications Services (RCS) communication" encompasses any form of text based messaging within the RCS standard. For example, a text based RCS communication may be a chat session. The term "chat session" encompasses any communications session between two or more UEs and in which text data (or messages) are exchange in a conversation thread. Chat session may, for example, refer to a chat session within the RCS standard. A text based RCS communication may be a short messaging service (or "text") message, which may be exchanged between UEs using the RCS standard outside of a chat session.

A chat session is distinct from a call, in which audio and/or video data may be exchanged between UEs in real time.

Messaging and social communication services typically allow for sending messages, images and videos between first and second UEs. Users enjoy the opportunity to share media content such as images, videos etc. with friends and family. However, in current IMSs, media content that is shared between UEs may be stored on the receiving UE and may be further shared, re-sent or published without the original content owner's knowledge.

This is a well-known problem for many users today and now new services are being developed to alleviate security issues surrounding shared media content. Applications exist that allow for sending media content from a first UE to a second UE such that the media content is automatically deleted after it has been viewed at the second UE. Some users are more comfortable using such applications providing viewing and storing restrictions.

Currently, there is no support for restricting the usage of received of images and video clips in the RCS standard (e.g., RCS 5.1). In RCS 5.1, the supported method of transferring media content between UEs is file transfer point-to-point via message session relay protocol (MSRP) or hypertext transfer protocol (HTTP), or to multiple users via HTTP. However, the receiving user becomes the owner of the media content when received at the UE and may access the media content whenever they desire.

Figure 1:
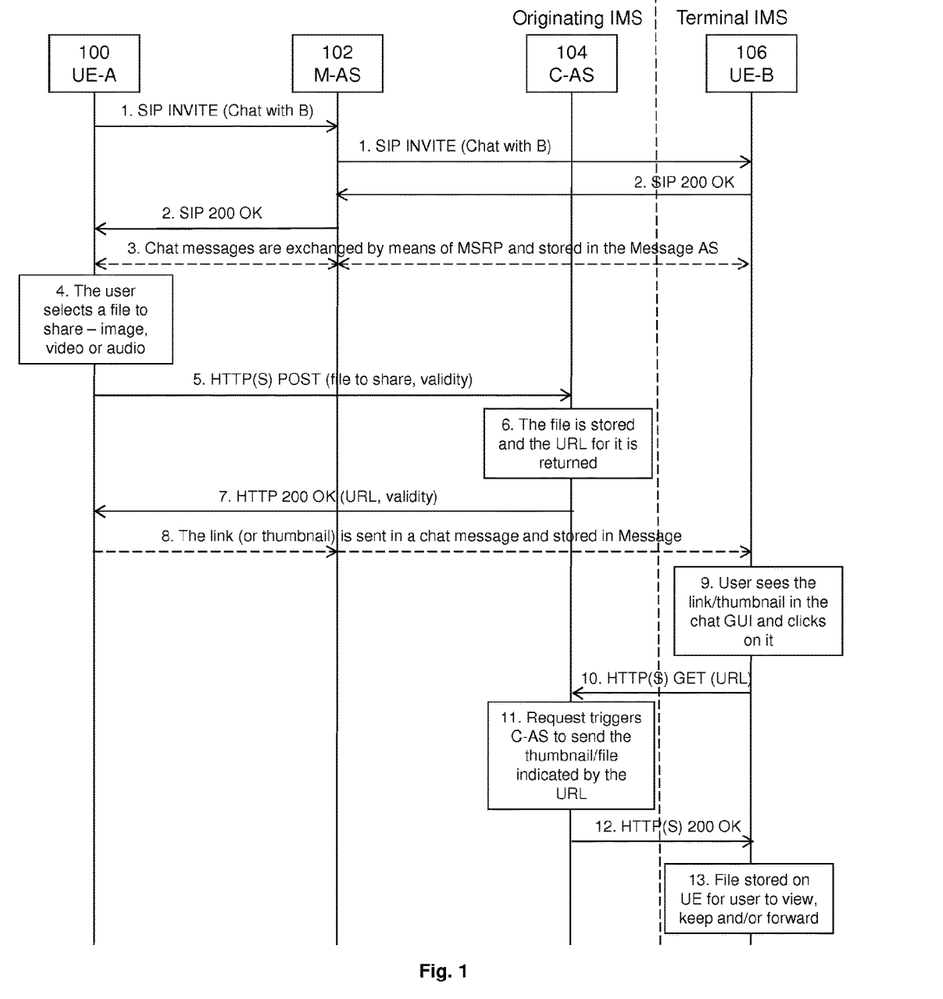
FIG. 1 is a signaling diagram a file transfer using the HTTP method.

Error! Reference source not found. shows a schematic and somewhat simplified illustration of a file transfer using the HTTP method in RCS 5.1.

1. A first UE 100 (UE-A) transmits an SIP INVITE message to a message AS 102 (M-AS) requesting a chat with a second UE 106 (UE-B). The message AS 102 transmits the SIP INVITE message to the second UE 106
2. The second UE 106 transmits an SIP 200 OK message to the message AS 102 to accept the invitation to chat. The message AS 102 transmits the SIP 200 OK message to the first UE 100
3. Chat messages are exchanged between the first and second UEs 100, 106 via the message AS 102 using the MSRP. The messages are stored in the message AS 102
4. The user of the first UE 100 selects a media file to share with the user of the second UE 106
5. An HTTP(S) POST message relating to the media file to be shared is sent from the first UE 100 to a content AS 104
6. The file is stored at the content AS 104 and a URL for the media file is returned
7. An HTTP 200 OK message comprising the returned URL is transmitted from the content AS 104 to the first UE 100
8. The first UE 100 transmits the link (or a thumbnail identifying the link) to the message AS 102, which transmits the link to the second UE 106
9. The user of the second UE 106 clicks on the URL or thumbnail
10. An HTTP(S) GET(URL) message is sent from the second UE 106 to the content AS 104 to request the media file
11. The content AS 104 obtains the media file indicated by the URL
12. The content AS 104 sends an HTTP(S) 200 OK message to the second UE 106 containing the media file
13. The media file is stored at the second UE 106

SUMMARY

Methods and apparatus disclosed herein provide a framework for sharing media content between UEs in such a way that the media content is not stored at the receiving UE.

According to a first aspect of the invention, there is provided an application server (204, 300) for use in an Internet protocol multimedia subsystem, IMS, and for streaming media content received from a first user equipment (200, 400) to a second user equipment (206, 500) using the Rich Communications Services, RCS, standard. The application server comprises a receiver configured to receive media content from the first user equipment as an RCS file transfer and to store the media content in a memory (306). The receiver is further configured to receive a request for the media content from the second user equipment. The application server comprises a data converter configured, in response to the request for media content, to convert the stored media content into streaming data suitable for streaming to the second user equipment. The application server comprises a transmitter configured to stream the streaming data to the second user equipment as an RCS video share, such that the media content can be viewed at the second user equipment only while it is being streamed.

Optionally, the application server further comprises a media content identification unit (316) configured to determine a media content identifier identifying the stored media content, wherein the transmitter (302) is configured to transmit the media content identifier to the first user equipment (200, 400), and wherein the request for the media content comprises data relating to the media content identifier.

Optionally, the media content identifier comprises a uniform resource locator.

Optionally, the application server is configured to stream the streaming data while the first user equipment (200, 400) and the second user equipment (206, 500) are engaged in a text based communication.

Optionally, the text based communication is one of a chat session or a short messaging service communication.

Optionally, the transmitter (302) is configured to stream the streaming data using the real-time transport protocol.

Optionally, the data converter (314) is configured to permit a user operating the second user equipment (206, 500) to stream the streaming data a limited number of times.

Optionally, the data converter (314) is configured to permit a user operating the second user equipment (206, 500) to stream the streaming data during a limited time period.

Optionally, the receiver (304) is configured to receive a streaming signal from the second user equipment (206, 500), and wherein the transmitter (302) is configured to stream the streaming data to the second user equipment only if the streaming signal is being received.

Optionally, the receiver (304) is configured to receive a consumption indicator associated with the media content and identifying restrictions on the consumption of the media content by the second user equipment (206, 500).

Optionally, the media content comprises one or more of an image file, a video file and an audio file.

According to a second aspect of the invention, there is provided a method for operating an application server (204, 300) in an Internet protocol multimedia subsystem, IMS, the application server being for streaming media content received from a first user equipment (200, 400) to a second user equipment (206, 500) using the Rich Communications Services, RCS, standard. The method comprises receiving, by a receiver (304), media content from the first user equipment as an RCS file transfer. The method comprises storing the media content in a memory (306). The method comprises receiving, by the receiver, a request for the media content from the second user equipment. The method comprises in response to the request for media content, converting, by a data converter (314), the stored media content into streaming data suitable for streaming to the second user equipment. The method comprises streaming, by a transmitter (302), the streaming data to the second user equipment as an RCS video share, such that the media content can be viewed at the second user equipment only while it is being streamed.

Optionally, the method further comprises determining, by a media content identification unit (316), a media content identifier identifying the stored media content; transmitting, by the transmitter (302), the media content identifier to the first user equipment (200, 400), wherein the request for the media content comprises data relating to the media content identifier.

Optionally, the media content identifier comprises a uniform resource locator.

Optionally, the streaming data is streamed while the first user equipment (200, 400) and the second user equipment (206, 500) are engaged in a text based communication.

Optionally, the text based communication is one of a chat session or a short messaging service communication.

Optionally, the streaming data is streamed using the real-time transport protocol.

Optionally, the method further comprises limiting, by the data converter (314), a number of times a user operating the second user equipment (206, 500) is permitted to stream the streaming data.

Optionally, the method further comprises limiting, by the data converter (314), a time period during which a user operating the second user equipment (206, 500) is permitted to stream the streaming data.

Optionally, the method further comprises receiving, by the receiver (304), a streaming signal from the second user equipment (206, 500), wherein the streaming data is streamed to the second user equipment only if the streaming signal is being received.

Optionally, the method further comprises receiving, by the receiver (304), a consumption indicator associated with the media content and identifying restrictions on the consumption of the media content by the second user equipment (206, 500).

According to a third aspect of the invention, there is provided a computer program comprising instructions which, when executed on at least one processor, cause the at least one processor to carry out the method described above.

According to a fourth aspect of the invention, there is provided a carrier containing the computer program mentioned above, wherein the carrier is one of an electronic signal, optical signal, radio signal, or non-transitory computer readable storage medium.

According to a fifth aspect of the invention, there is provided a user equipment (200, 400), being a first user equipment, for use in an Internet protocol multimedia subsystem, IMS, and for transferring media content to a second user equipment (206, 500) using the Rich Communications Services, RCS, standard. The first user equipment comprises a transmitter (402) configured to transmit media content to an application server (204, 300) as an RCS file transfer. The first user equipment comprises a message compiler (416) configured to compile a message comprising a media content identifier identifying the media content. The transmitter is further configured to transmit the compiled message to the second user equipment using an RCS text based communication.

Optionally, the user equipment (200, 400) further comprises a receiver (404) configured to receive the media content identifier from the application server.

Optionally, the media content identifier comprises a uniform resource locator.

Optionally, the message compiler (416) is configured to compile the message comprising a consumption indicator associated with the media content and identifying restrictions on the consumption of the media content by the second user equipment (206, 500).

Optionally, the user equipment (200, 400) further comprises a media content selection unit (414) configured to select media content for transfer to the second user equipment, wherein the selected media content is transmitted to the application server (204, 300).

According to a sixth aspect of the invention, there is provided a method for operating a user equipment (200, 400), being a first user equipment, for use in an Internet protocol multimedia subsystem, IMS, and for transferring media content to a second user equipment (206, 500) using the Rich Communications Services, RCS, standard. The method comprises transmitting, by a transmitter (402), media content to an application server (204, 300) as an RCS file transfer. The method comprises compiling, by a message compiler (416), a message comprising a media content identifier identifying the media content. The method comprises transmitting, by the transmitter, the compiled message to the second user equipment using an RCS text based communication.

Optionally, the method further comprises receiving, by a receiver (404), the media content identifier from the application server (204, 300).

Optionally, the media content identifier comprises a uniform resource locator.

According to a seventh aspect of the invention, there is provided a computer program comprising instructions which, when executed on at least one processor, cause the at least one processor to carry out the method described above.

According to a eighth aspect of the invention, there is provided a carrier containing the computer program described above, wherein the carrier is one of an electronic signal, optical signal, radio signal, or non-transitory computer readable storage medium.

According to a ninth aspect of the invention, there is provided a user equipment (206, 500), being a second user equipment, for use in an Internet protocol multimedia subsystem, IMS, and for receiving streamed media content from an application server (204, 300) using the Rich Communications Services, RCS, standard, the media content originating from a first user equipment (200, 400). The second user equipment comprises a receiver (504) configured to receive an RCS text based communication from the first user equipment, the RCS text based communication comprising a media content identifier identifying media content stored on the application server. The second user equipment comprises a transmitter (502) configured to send a request for the media content to the application server. The receiver is further configured to receive streaming data representing the media content from the application server as an RCS video share, such that the media content can be viewed at the second user equipment only while it is being streamed.

Optionally, the media content identifier comprises a uniform resource locator.

Optionally, the receiver (504) is configured to receive the streaming data using the real-time transport protocol.

Optionally, the user equipment (206, 500) further comprises a streaming signal generator (516) configured to generate a streaming signal in response to an input from the user at the user interface, wherein the transmitter (502) is configured to transmit the streaming signal to the application server 204, 300).

Optionally, the user equipment (206, 500) further comprises a user interface (514) configured to display the media content identifier to a user and to receive a user input indicating that the user wishes to view the media content, wherein the transmitter (502) is configured to send the request for media content in response to the user input.

According to a tenth aspect of the invention, there is provided a method for operating a user equipment (206, 500), being a second user equipment, for use in an Internet protocol multimedia subsystem, IMS, and for receiving streamed media content from an application server (204, 300) using the Rich Communications Services, RCS, standard, the media content originating from a first user equipment (200, 400). The method comprises receiving, by a receiver (504), an RCS text based communication from the first user equipment the RCS text based communication comprising a media content identifier identifying media content stored on the application server. The method comprises transmitting, by a transmitter (502), a request for the media content to the application server. The method comprises receiving, by the receiver, streaming data representing the media content from the application server as an RCS video share, such that the media content can be viewed at the second user equipment only while it is being streamed.

Optionally, the media content identifier comprises a uniform resource locator.

Optionally, the receiver (504) receives the streaming data using the real-time transport protocol.

Optionally, the method further comprises generating, by a streaming signal generator, a streaming signal in response to an input from the user at the user interface and transmitting, by the transmitter (502), the streaming signal to the application server 204, 300).

According to an eleventh aspect of the invention, there is provided a computer program comprising instructions which, when executed on at least one processor, cause the at least one processor to carry out the method as described above.

According to a twelfth aspect of the invention, there is provided a carrier containing the computer program described above, wherein the carrier is one of an electronic signal, optical signal, radio signal, or non-transitory computer readable storage medium.

BRIEF DESCRIPTION OF THE DRAWINGS

Exemplary embodiments of the invention are described herein with reference to the accompanying drawings, in which.

DETAILED DESCRIPTION

Generally, disclosed herein are methods and apparatus for sharing media content from a first UE with a second UE using the RCS standard such that the media content is not stored at the second UE. The media content may be streamed from a content AS to the second UE. The streaming may be done using a file transfer in the RCS standard. The media content may be streamed from the content AS to the second UE outside of a call environment, that is, while the first and second UEs are not connected in a call. The media content may be streamed from the content AS to the second UE while the first and second UEs are engaged in an RCS text based communication, such as a chat session or an SMS message.

The methods and apparatus disclosed re-use existing RCS enablers as much as possible. This avoids any significant impact on current RCS clients and the RCS 5.1 specification.

Existing applications allowing for the automatic deletion of media content typically use a DRM-like solution to implement the functionality, but this requires that the receiving UE has its own image viewer and/or video/audio player to protect the image from being copied and/or shared. However, the inventors have appreciated that a new DRM-like client solution is not wanted by the terminal industry and requires modification of terminals and operating systems for implementation.

A drawback with a client based DRM-like solution is that the implementation effort is high for the device vendor. An RCS messaging client uses a standard image/video viewer in the terminal operating system to view a shared image. A new RCS requirement to handle specific image protection will have a large impact on the operating system provided by, for example, Google, Microsoft or Apple. The methods and apparatus disclosed remove the requirement for any adaption of the RCS client and the operating system.

The inventors have appreciated that the RCS standard may be used to deliver media content to a UE such that it is not stored at the receiving UE. Specifically, the inventors have appreciated that media content may be streamed to from a sending UE to a receiving UE by uploading media content to an AS using the file transfer protocol of the RCS standard and streaming the media content to the receiving UE from the AS using a video sharing protocol of the RCS standard.

Methods and apparatus disclosed may be based on a combination of two existing RCS enablers. A first UE may send media content such as an image, video clip or audio clip as an RCS file transfer to a content AS. At a second UE, the image, video clip or audio clip is streamed from a server (using for example video share IR.84 mechanism) when a user of the second UE requests the media content.

The media content may be tagged with a consumption indicator when the file is transferred to the content AS. The consumption indicator may identify a specific content type, having specific restrictions on consumption of the media content by the second UE. For example, the consumption indicator may identify that the second UE (or a user thereof) may consume the media content only once or unlimited times during a limited time period.

Figure 2:
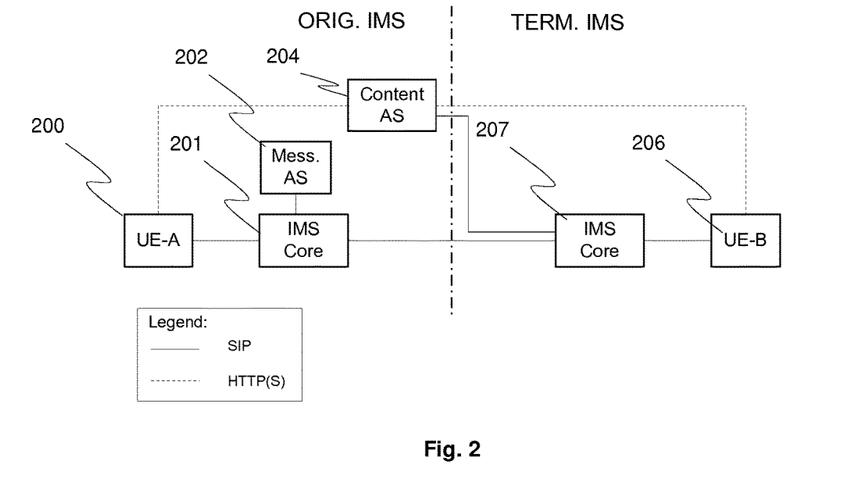
FIG. 2 is a block schematic diagram of an IMS.

FIG. 2 shows a schematic representation of an IMS for use with the methods and apparatus disclosed herein. A first UE 200 is in electrical communication with an originator IMS core 201. The originator IMS core 201 is in electrical communication with a message AS 202. The first UE 200 is also in electrical communication with a content AS 204. The content AS 204 is in electrical communication with a second UE 206. The content AS 204 is in electrical communication with a terminal IMS core 207. The second UE 206 is also in electrical communication with the terminal IMS core 207. The originator IMS core 201 is in electrical communication with the terminal IMS core 207.

Figure 3:
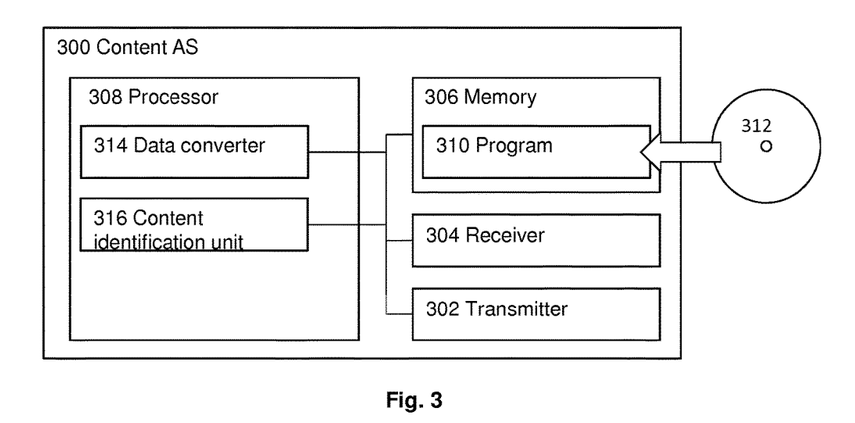
FIG. 3 shows a block schematic diagram of a content application server.

FIG. 3 shows a schematic representation of a content AS 300 for streaming media originating from the first UE 200 to the second UE 206 use in the IMS while the first and second user equipments 200, 206 are in a chat session. The content AS 204 shown in FIG. 2 may be a content AS 300, as shown in FIG. 3.

The content AS 300 comprises a transmitter 302 and a receiver 304. The transmitter 302 and receiver 304 are in electrical communication with other communication units, UEs, servers and/or functions in a telecommunications network and are configured to transmit and receive data accordingly.

It is noted that the term "electrical communication" encompasses both wired and wireless electrical communication. Therefore, electrical communication may be, for example, a network communication over a wired connection or a network communication of over a radio frequency connection.

The content AS 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of a data converter 314 and a media content identification unit 316, as set out below.

Each of the transmitter 302 and receiver 304, memory 306, processor 308 and data converter 314 is in electrical communication with the other features 302, 304, 306, 308, 310, 314, 316 of the content AS 300. The content AS 300 can be implemented as a combination of computer hardware and software. In particular, the data converter 314 and the media content identification unit 316 may be implemented as software configured to run on the processor 308. The memory 306 stores the various programs/executable files that are implemented by a processor 308, and also provide a storage unit for any required data. The programs/executable files stored in the memory 306, and implemented by the processor 308, can include the data converter 314 and the media content identification unit 316, but are not limited to such.

Figure 4:
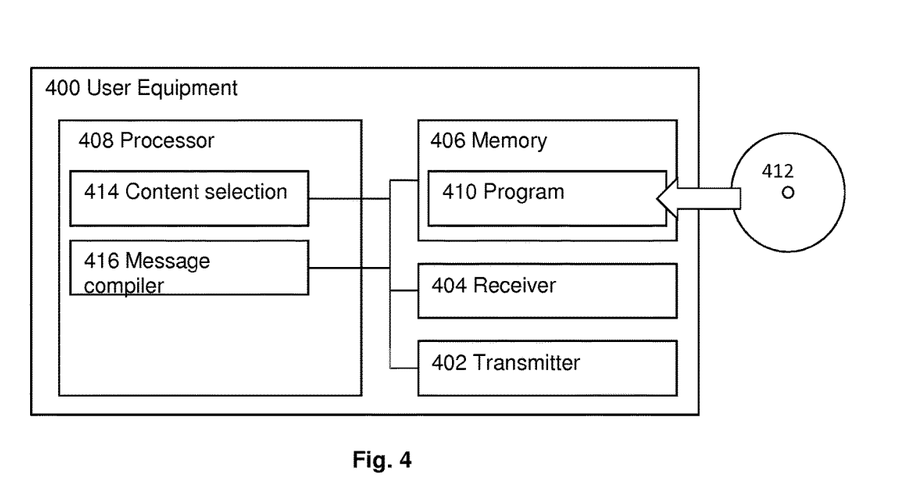
FIGS. 4 and 5 show a block schematic diagrams of user equipments.

FIG. 4 shows a schematic representation of a UE 400. The first UE 200 may be a UE 400, as shown in FIG. 4. The UE 400 comprises a transmitter 402 and a receiver 404. The transmitter 402 and receiver 404 are in electrical communication with other communication units, UEs, servers and/or functions in a computer network and configured to transmit and receive data accordingly.

The UE 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake at least the functions of a content selection unit 414 and a message compiler 416, as set out below.

Each of the transmitter 402, receiver 404, memory 406, processor 408, content selection unit 414 and message compiler 416 is in electrical communication with the other features 402, 404, 406, 408, 410, 414, 416 of the UE 400. The UE 400 can be implemented as a combination of computer hardware and software. In particular, content selection unit 414 and message compiler 416 may be implemented as software configured to run on the processor 408. The memory 406 stores the various programs/executable files that are implemented by a processor 408, and also provide a storage unit for any required data.

The programs/executable files stored in the memory 406, and implemented by the processor 408, can include the content selection unit 414 and message compiler 416, but are not limited to such.

Figure 5:
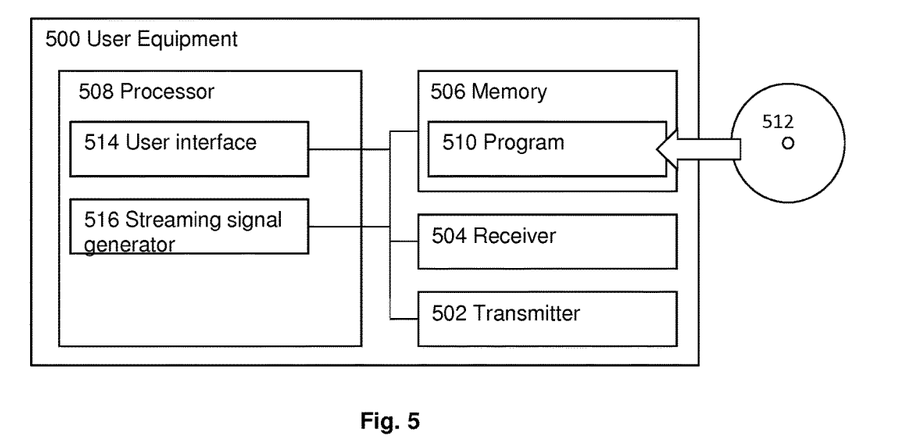

FIG. 5 shows a schematic representation of a UE 500. The second UE 206 may be a UE 500, as set out in FIG. 5. Further, it is noted that, in particular exemplary methods and apparatus, the first and second UEs 200, 206 may each have all the features of both the UE 400 and the UE 500. That is, the first and second UEs 200, 206 may each have the features of a content selection unit 414, a message compiler 416, a user interface 514 and a streaming signal generator 516.

The UE 500 comprises a transmitter 502 and a receiver 504. The transmitter 502 and receiver 504 are in electrical communication with other communication units, UEs, servers and/or functions in a computer network and configured to transmit and receive data accordingly.

The UE 500 further comprises a memory 506 and a processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake at least the functions of a user interface 514 and a streaming signal generator 516, as set out below.

Each of the transmitter 502, receiver 504, memory 506, processor 508, user interface 514 and streaming signal generator 516 is in electrical communication with the other features 502, 504, 506, 508, 510, 514, 516 of the UE 500. The UE 500 can be implemented as a combination of computer hardware and software. In particular, user interface 514 and streaming signal generator 516 may be implemented as software configured to run on the processor 508. The memory 506 stores the various programs/executable files that are implemented by a processor 508, and also provide a storage unit for any required data.

The programs/executable files stored in the memory 506, and implemented by the processor 508, can include the user interface 514 and streaming signal generator 516, but are not limited to such.

When methods and apparatus disclosed herein are in use, a user of the first UE 200 may wish to share media content such as an image, video or audio file with a user of the second UE 206 using the RCS standard. For example, the media content may be shared during a 1-1 chat session, which may be a group chat session, using the IMS. The media content may be retrieved from the content AS 204 by the second UE 206 by sending a message with a media content identifier (e.g., a URL) identifying the stored media content. Another exemplary use may be that the user of the first UE 200 wishes to share media content temporarily outside an established chat. In that case, a stand-alone message could be used to carry the reference.

Both these methods are described in RCS 5.1 and referred to as 'File Transfer via HTTP'. However, to ensure that the media content can only be viewed at the second UE 206 while it is being streamed, a new content-type may be used, and new parameters may be added to the RCS 5.1 messages.

The media content file that is to be shared is up-loaded to a content AS 206 which also acts as a user agent client (UAC) for sending a one-way video stream in a standard way, e.g., Video Share phase 2 (IR.84), to the second UE 206.

The second UE 206 receives a notification in the chat session graphical user interface indicating that there is a media content file that can be viewed. The notification may be shown as link or thumbnail. When the user of the second UE 206 wants to view the file, the link may be "clicked" and a request is subsequently sent to the content AS 204 to view the media content.

The content AS 204 may initiate a video share session and the second UE 206 may accept the session request. The data converter 414 of the content AS 204 converts the stored media content file to streaming data representing the media content, such as an RTP stream. The transmitter 302 of the content AS 204 streams the streaming data towards the second UE 206, for example, using an RCS (or HTTP) file transfer. Possibly the duration of the streaming is limited by a default, or by a user defined consumption indicator. Before transmission of the streaming data, the content AS 204 may check that the second UE's client is capable of receiving a video stream, e.g., according to IR.84.

The content AS 204 may send an SIP 200 OK message to the second UE 206 to indicate that the HTTP File Transfer is completed, albeit that no actual file has been transferred and, instead, the media content has been streamed. The content AS 204 stores information that the second UE (or its user as defined by a user profile) has viewed/heard the media content. This may be used to restrict access to the media content when the total number of times the content has been viewed/heard reaches a limit set by the consumption indicator. If that occurs, further streaming attempts may be rejected. Further, after a validity period, which may be a time period set by the consumption indicator, the media content may expire and the content AS 204 may purge the file from its memory 306.

Figure 6:
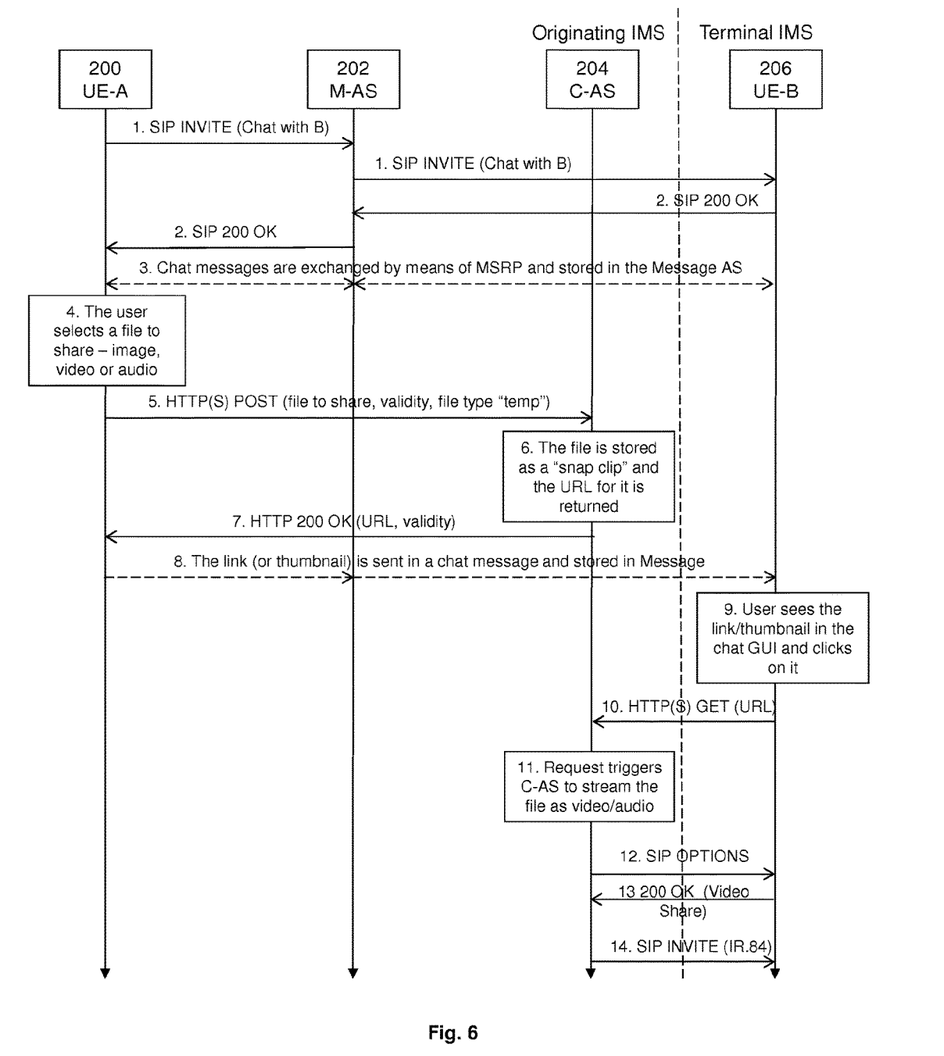
FIG. 6 shows a signaling diagram a file transfer by streaming.

FIG. 6 shows an exemplary signaling diagram for a method of streaming media content from a first UE 200 to a second UE 206.

1. The transmitter 402 of the first UE 200 (UE-A) transmits an SIP INVITE message to a message AS 202 (M-AS) requesting a chat with a second UE 206 (UE-B). The SIP INVITE message may be transmitted to the message AS 202 via the originating IMS core 201. The message AS 202 transmits the SIP INVITE message to the second UE 206 where it is received by the receiver 504. The message AS 202 may transmit the SIP INVITE message to the second UE 206 via the originating IMS core 201 and the terminal IMS core 207. It is noted that in the methods disclosed herein, the UE 206 may be a legacy RCS device and no changes to UE-B 206 are necessary for it to be used with such methods.
2. The transmitter 502 of the second UE 206 transmits an SIP 200 OK message to the message AS 202 to accept the invitation to chat. The transmitter 502 of the second UE 206 may transmit the SIP 200 OK message to the message AS 202 via the terminal IMS core 207 and the originating IMS core 201. The message AS 202 transmits the SIP 200 OK message to the receiver 404 of the first UE 200. The message AS 202 may transmit the SIP 200 OK message via the originating IMS core 201.
3. Chat messages are exchanged between the transmitters 402 and receivers 404 of the first and second UEs 200, 206 via the message AS 202 (and the IMS cores 201, 207) using the MSRP. The messages may be stored in the message AS 202. The chat messages may be exchanged as part of a text based RCS communication, such as a chat session.
4. The user of the first UE 200 selects media content to share with the user of the second UE 206 using the media content selection unit 414. In the exemplary case of FIG. 6, the media content is a video/audio file although other media content may be selected. The user may mark the media content as "snap" media content. As a prerequisite, UE-A 200 may check that UE-B has the capability to receive video stream data. Accordingly, an exchange of messages may be undertaken prior to the chat starting, as specified in RCS 5.1.

5. An HTTP(S) POST message relating to the media content to be shared is sent from the transmitter 402 of the first UE 200 to the receiver 304 of content AS 204. The HTTP(S) POST message may comprise the selected media content. The HTTP(S) POST message may comprise a consumption indicator associated with the media content and identifying restrictions on the consumption of the media content by the second UE 206 (or its user). For example, the consumption indicator may specify a number of times that the media content may be streamed to the second UE 206. Alternatively or in addition, the consumption indicator may specify a time duration during which the media content may be streamed to the second UE 206.
6. The media content is stored in the memory 306 of the content AS 204. The content identification unit 316 of the content AS 204 generates a media content identifier identifying the media content. The content media identifier may be a uniform resource locator (URL) or any other type of identifier.
7. An HTTP 200 OK message comprising the media content identifier is transmitted by the transmitter 302 of the content AS 204 to the receiver 404 of the first UE 200.
8. The transmitter 402 of the first UE 200 transmits the media content identifier, which may be a URL link (or a thumbnail identifying the link) to the receiver 504 of the second UE 206. The media content identifier may be transmitted to the second UE 206 via the message AS 202.
9. The user interface 514 of the second UE 206 displays the media content identifier to the user of the second UE 206. The user selects the media content identifier providing a user input indicating that they wish to view the media content.
10. An HTTP(S) GET(URL) message is transmitted by the transmitter 502 of the second UE 206 to the receiver 304 of the content AS 204 to request access to the media content.
11. The data converter 314 of the content AS 204 obtains the media content identified by the media content identifier. The data converter 314 converts the media content into streaming data for streaming to the second UE 206.
12. The HTTP(S) GET(URL) message from second UE 206 triggers the content AS 204 to check the Video Share capability of the second UE 206 and sends a SIP OPTIONS request.
13. The transmitter 502 of the second UE 206 transmits to the receiver 304 of the content AS 204 a response to the SIP OPTIONS request (200 OK) indicating that Video Share is supported.
14. The transmitter 302 of the content AS 204 transmits an SIP INVITE (IR.84) message to the receiver 504 of the second UE 206. Steps 13 and 14 set up the streaming of the media content in the RCS standard.
15. The request to share the media content is accepted by the user of the second UE 206.
16. The transmitter 502 of the second UE 206 transmits an SIP 200 OK message to the receiver 304 of the content AS 204.
17. The transmitter 302 of the content AS 204 streams the streaming data to the receiver 504 of the second UE 206 using the RTP. Optionally, the streaming signal generator 516 of the second UE 206 may be configured to generate a streaming signal in response to an input from the user to the user interface 514. For example, the user of the second UE 206 may be required to press a button and/or the screen of the second UE 206 in order to generate the streaming signal. If the button/screen is not pressed, the streaming signal will not be generated. The transmitter 502 of the second UE 206 may transmit the streaming signal to the receiver 304 of the content AS 204. The transmitter 302 of the content AS 204 does not stream the streaming data if the streaming signal is not being received. Therefore, if the user releases the finger then the video share session may be terminated. The user equipment's screen shot feature is then not accessible during the image/video streaming.
18. The transmitter 302 of the content AS 204 responds with an HTTP(S) 200 OK message to indicate that the File Transfer session is completed to the receiver 504 of the second UE 206.
19. The media content is displayed to the user of the second UE 206 during streaming via the user interface 514.
20. The data converter records the number of times that the user of the second UE 206 has consumed the media content and/or monitors the time since step 8, i.e. since the media content has been available to the second UE 206.
21. If the restrictions imposed by the consumption indicator have been exceeded, the transmitter 302 of the content AS 204 transmits to the receiver 504 of the second UE 206 a SIP BYE message.
22. The second UE 206 responds by transmitting a SIP 200 OK message to the content AS 204.
23. The data converter 314 of the content AS 204 records the fact that the second UE 206 has consumed the media content.

Figure 7:
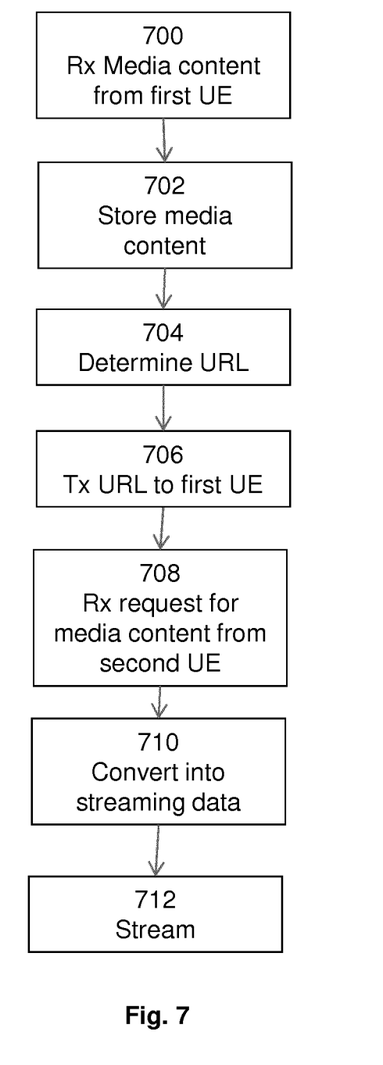
FIGS. 7 to 9 show flow diagrams.

FIG. 7 shows a method for operating an application server in an IMS the application server for streaming media content received from a first UE 200 to a second UE 206 while the first and second UEs are in a chat session. The receiver 304 receives 700 media content from the first UE 200. The media content is stored 702 in memory 306. The media content identification unit 316 may determine 704 a media content identifier, such as a URL, identifying the media content. The transmitter 302 may transmit 706 the media content identifier to the first UE 200. The receiver receives 708 a request for the media content from the second UE 206. The data converter 314 converts 710 the media content into streaming data that is then streamed 712 by the transmitter 302.

Figure 8:
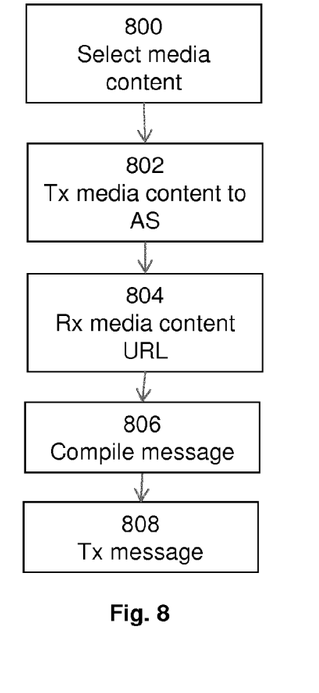

FIG. 8 shows a method for operating a first UE 200 for use in an IMS and for transferring media content to a second UE 206 while the first and second UEs are in a chat session. The media content selection unit 414 selects 800 media content for transfer to the second UE 206. The transmitter 402 transmits 802 the selected media content to the content AS 204. The receiver 404 receives 804 a media content identifier identifying the media content. The message compiler 416 compiles 806 a message comprising the media content identifier. The transmitter 402 transmits 808 the compiled message to the second UE.

Figure 9:
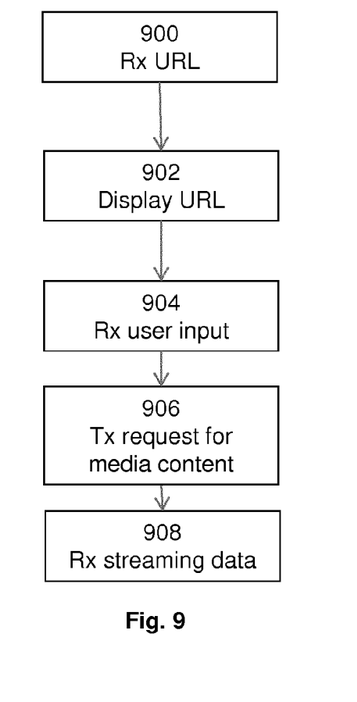

FIG. 9 shows a method for operating a second UE 200 for use in an IMS and for receiving streamed media content from an application server 204, the media content originating from a first UE 200 while the first and second UEs are in a chat session. The receiver 504 receives 900 a media content identifier identifying media content stored on the content AS 204. The user interface 514 displays 902 the media content identifier to a user and receives 904 a user input indicating that the user wishes to view the media content. The transmitter 502 transmits 906 in response to the user input, a request for the media content to the content AS 204. The receiver 504 receives 908 streaming data representing the media content from the content AS 204.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An application server configured for use in an Internet protocol multimedia subsystem (IMS) and configured to stream media content received from a first user equipment to a second user equipment using the Rich Communications Services (RCS) standard, the application server comprising:
    a receiver configured to receive media content from the first user equipment as an RCS file transfer and to store the media content in a memory, the receiver being further configured to receive a request for the media content from the second user equipment;
    processing circuitry configured, in response to the request for the media content, to convert the stored media content into streaming data suitable for streaming to the second user equipment; and
    a transmitter configured to stream the streaming data to the second user equipment as an RCS video share, such that the media content can be viewed at the second user equipment only while it is being streamed.

2. The application server according to claim 1, wherein the processing circuitry is configured to determine a media content identifier identifying the stored media content,
    wherein the transmitter is configured to transmit the media content identifier to the first user equipment,
    and wherein the request for the media content comprises data relating to the media content identifier.

3. The application server according to claim 2, wherein the media content identifier comprises a uniform resource locator.

4. The application server according to claim 1, wherein the application server is configured to stream the streaming data while the first user equipment and the second user equipment are engaged in a text based communication.

5. The application server according to claim 4, wherein the text based communication is one of a chat session and a short messaging service communication.

6. The application server according to claim 1, wherein the transmitter is configured to stream the streaming data using a real-time transport protocol.

7. The application server according to claim 1, wherein the processing circuitry is configured to permit a user operating the second user equipment to stream the streaming data a limited number of times.

8. The application server according to claim 1, wherein the processing circuitry is configured to permit a user operating the second user equipment to stream the streaming data during a limited time period.

9. The application server according to claim 1, wherein the receiver is configured to receive a streaming signal from the second user equipment, and wherein the application server is configured to stream the streaming data to the second user equipment only if the streaming signal is being received.

10. The application server according to claim 1, wherein the receiver is configured to receive a consumption indicator associated with the media content and identifying restrictions on consumption of the media content by the second user equipment.

11. The application server according to claim 1, wherein the media content comprises one or more of an image file, a video file, and an audio file.

12. A method in an application server configured for operation in an Internet protocol multimedia subsystem (IMS), for streaming media content received from a first user equipment to a second user equipment using the Rich Communications Services (RCS) standard, the method comprising:
receiving media content from the first user equipment as an RCS file transfer;
storing the media content in a memory;
receiving a request for the media content from the second user equipment;
in response to the request for the media content, converting the stored media content into streaming data suitable for streaming to the second user equipment; and
streaming the streaming data to the second user equipment as an RCS video share, such that the media content can be viewed at the second user equipment only while it is being streamed.

13. The method according to claim 12, further comprising:
determining a media content identifier identifying the stored media content; and
transmitting the media content identifier to the first user equipment, wherein the request for the media content comprises data relating to the media content identifier.

14. The method according to claim 13, wherein the media content identifier comprises a uniform resource locator.

15. The method according to claim 12, wherein the streaming data is streamed while the first user equipment and the second user equipment are engaged in a text based communication.

16. The method according to claim 15, wherein the text based communication is one of a chat session and a short messaging service communication.

17. The method according to claim 12, wherein the streaming data is streamed using a real-time transport protocol.

18. The method according to claim 12, further comprising limiting a number of times a user operating the second user equipment is permitted to stream the streaming data.

19. The method according to claim 12, further comprising limiting a time period during which a user operating the second user equipment is permitted to stream the streaming data.

20. The method according to claim 12, further comprising:
receiving a streaming signal from the second user equipment, wherein the streaming data is streamed to the second user equipment only if the streaming signal is being received.

21. The method according to claim 12, further comprising receiving a consumption indicator associated with the media content and identifying restrictions on consumption of the media content by the second user equipment.

22. A non-transitory computer readable storage medium storing a computer program comprising instructions that, when executed on at least one processor of an application server in an Internet protocol multimedia subsystem (IMS), configure the application server to:
receive media content from a first user equipment as a Rich Communications Services (RCS) file transfer;
store the media content in a memory;
receive a request for the media content from a second user equipment;
in response to the request for the media content, convert the stored media content into streaming data suitable for streaming to the second user equipment; and
stream the streaming data to the second user equipment as an RCS video share, such that the media content can be viewed at the second user equipment only while it is being streamed.

23. A first user equipment configured for use in an Internet protocol multimedia subsystem (IMS) and further configured to transfer media content to a second user equipment using the Rich Communications Services (RCS) standard, the first user equipment comprising:
a transmitter configured to transmit media content to an application server as an RCS file transfer; and
processing circuitry configured to compile a message comprising a media content identifier identifying the media content;
wherein the transmitter is further configured to transmit the compiled message to the second user equipment using an RCS text based communication.

24. The first user equipment according to claim 23, further comprising a receiver configured to receive the media content identifier from the application server.

25. The first user equipment according to claim 23, wherein the media content identifier comprises a uniform resource locator.

26. The first user equipment according to claim 23, wherein the processing circuitry is configured to compile the message to further include a consumption indicator associated with the media content and identifying restrictions on the consumption of the media content by the second user equipment.

27. The first user equipment according to claim 23, wherein the processing circuitry is configured to select media content for transfer to the second user equipment, wherein the selected media content is transmitted to the application server.

28. A method in a first user equipment configured for use with an Internet protocol multimedia subsystem (IMS), for transferring media content to a second user equipment using the Rich Communications Services (RCS) standard, the method comprising:
transmitting media content to an application server as an RCS file transfer;
compiling a message comprising a media content identifier identifying the media content; and
transmitting the compiled message to the second user equipment using an RCS text based communication.

29. The method according to claim 28, further comprising receiving the media content identifier from the application server.

30. The method according to claim 28, wherein the media content identifier comprises a uniform resource locator.

31. A non-transitory computer readable storage medium storing a computer program comprising instructions that, when executed by at least one processor of a first user equipment configured for use with an Internet protocol multimedia subsystem (IMS), configure the first user equipment to transfer media content to a second user equipment using the Rich Communications Services (RCS) standard, the computer program comprising program instructions causing the first user equipment to:

transmit the media content to an application server as a, RCS file transfer;

compile a message comprising a media content identifier identifying the media content; and     transmit the compiled message to the second user equipment using an RCS text based communication.

32. A second user equipment for use in an Internet protocol multimedia subsystem (IMS) and configured to receive streamed media content from an application server using the Rich Communications Services (RCS) standard, the media content originating from a first user equipment, the second user equipment comprising:

a receiver configured to receive an RCS text based communication from the first user equipment, the RCS text based communication comprising a media content identifier identifying media content stored on the application server; and     a transmitter configured to send a request for the media content to the application server, wherein the receiver is further configured to receive streaming data representing the media content from the application server as an RCS video share, such that the media content can be viewed at the second user equipment only while it is being streamed.

33. The second user equipment according to claim 32, wherein the media content identifier comprises a uniform resource locator.

34. The second user equipment according to claim 32, wherein the receiver is configured to receive the streaming data using a real-time transport protocol.

35. The second user equipment according to claim 32, further comprising a user interface configured to display the media content identifier to a user and to receive a user input indicating that the user wishes to view the media content, wherein the second user equipment is configured to send the request for media content in response to the user input.

36. The second user equipment according to claim 35, wherein the second user equipment includes processing circuitry that is configured to generate a streaming signal in response to the user input at the user interface, and wherein the transmitter is configured to transmit the streaming signal to the application server.

37. A method in a second user equipment configured for operation in an Internet protocol multimedia subsystem (IMS), for receiving streamed media content from an application server using the Rich Communications Services (RCS) standard, the media content originating from a first user equipment, the method comprising:

receiving an RCS text based communication from the first user equipment, the RCS text based communication comprising a media content identifier identifying media content stored on the application server;

transmitting a request for the media content to the application server; and     receiving streaming data representing the media content from the application server as an RCS video share, such that the media content can be viewed at the second user equipment only while it is being streamed.

38. The method according to claim 37, wherein the media content identifier comprises a uniform resource locator.

39. The method according to claim 37, wherein the second user equipment receives the streaming data using a real-time transport protocol.

40. The method according to claim 39, further comprising:

generating a streaming signal in response to an input from a user at a user interface of the user equipment; and     transmitting the streaming signal to the application server.

41. A non-transitory computer readable storage medium storing a computer program comprising instructions that, when executed on at least one processor of a second user equipment that is configured for use in an Internet protocol multimedia subsystem (IMS), configures the second user equipment to receive streamed media content from an application server using the Rich Communications Services (RCS) standard, where the streamed media content originates from a first user equipment, and said program instructions cause the second user equipment to:

receive an RCS text based communication from the first user equipment, the RCS text based communication comprising a media content identifier identifying media content stored on the application server;

transmit a request for the media content to the application server; and     receive streaming data representing the media content from the application server as an RCS video share, such that the media content can be viewed at the second user equipment only while it is being streamed.

* * * * *